WILLIAM F. JONES.
Improvement in Churn-Dashers.

No. 114,016. Patented April 25, 1871.

Witnesses:
A. W. Almqvist
Wm. H. C. Smith

Inventor:
W. F. Jones.
PER
Munn & Co
Attorneys.

United States Patent Office.

WILLIAM F. JONES, OF EASTON, KANSAS.

Letters Patent No. 114,016, dated April 25, 1871.

IMPROVEMENT IN CHURN-DASHERS.

The Schedule referred to in these Letters Patent and making part of the same.

*To all whom it may concern:*

Be it known that I, WILLIAM F. JONES, of Easton, in the county of Leavenworth and State of Kansas, have invented a new and useful Improvement in Churn-Dasher; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved churn-dasher, which shall be so constructed and arranged as to bring the butter quickly and thoroughly, and with less labor than when the churning is done with dashers constructed in the ordinary manner; and It consists in the dasher, constructed as hereinafter more fully described.

A represents the body of the churn, which may have vertical ribs, B, attached to its inner surface, and which is provided with a cover, C, in the ordinary manner.

D is the dasher-shaft, to the lower end of which is attached a pivot which works in a socket attached to the center of the bottom of the churn A.

E is a pin or round passing transversely through the shaft D and to the ends of which are attached the dasher-blades, wings, or paddles F.

Figure 1:
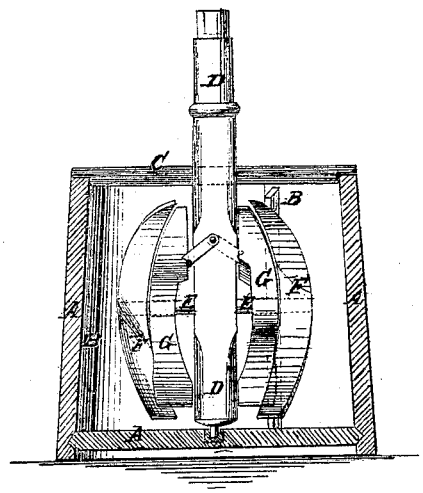
Figure 1 is a side view of my improved churn-dasher, showing it as attached to a churn.
Figure 2:
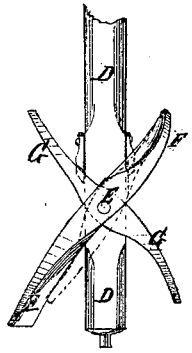
Figure 2 is an edge view of the dasher, detached.

The wings or blades F are bent or curved, as shown in figs. 1 and 2, and arranged spirally, and are made of such a length as to pass about half around the shaft D.

The upper or forward ends of the blades or wings F are made pointed or sharp, and the lower or rear ends flat.

The blades F should be secured to the ends of the pin E detachably, but in such a way as to be stationary upon the said pin when at work.

Upon the pin E, between the wings or blades F and the shaft D, are placed two other blades or wings, G, the outer edges of which are so formed as to correspond with the inner edges of the outer wings F, except that the outer part of the lower ends of the said wings G should overlap the lower parts of the wings F when the two sets of wings are placed parallel with each other.

When the wings F G are placed so as to cross each other diagonally, as shown in fig. 2, the wings G are secured in place by buttons or other fastenings attached to the shaft D, and which take hold of the edges of the upper parts of the said wings to secure them in place when the dasher is in use.

The middle part of the inner edges of the blades G are cut away, as shown in fig. 1, so that when the blades G are adjusted parallel with the blades F the said blades G may be slipped inward toward the shaft D, the shoulder of the inner edges of the blades G resting against the sides of the shaft D.

The blades G, when arranged parallel with the blades F, may be fastened or left loose, as may be desired.

The wings or blades may be arranged for the dasher to be turned to the right or to the left, as may be desired. As shown in the drawing, they are arranged for the dasher to be turned to the right.

When the blades are arranged diagonally the inner blades force the milk or cream upward and outward, and the outer blades force it downward and inward, so that it may be forced into violent agitation, bringing the butter in a very short time.

The dasher thus constructed readily gathers the butter into two balls, after which, by slightly twisting or turning the dasher as it is raised, it may be taken from the churn without disturbing the gathered butter.

Having thus described my invention,

I claim as new and desire to secure by Letters Patent—

An improved churn-dasher, consisting of the shaft D, transverse pin E, stationary outer wings F, and inner movable wings G, said parts being constructed and operating substantially as herein shown and described, and for the purpose set forth.

WILLIAM F. JONES.

Witnesses:
R. A. KELSEY,
ALFRED B. JONES.